United States Patent
Wei

(10) Patent No.: US 9,264,335 B2
(45) Date of Patent: *Feb. 16, 2016

(54) ADAPTIVE PACKAGING OF NETWORK RESOURCES

(71) Applicant: Facebook, Inc., Menlo Park, CA (US)

(72) Inventor: Xiaoliang Wei, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/497,031

(22) Filed: Sep. 25, 2014

(65) Prior Publication Data

US 2015/0012653 A1 Jan. 8, 2015

Related U.S. Application Data

(63) Continuation of application No. 12/543,367, filed on Aug. 18, 2009, now Pat. No. 8,874,694.

(51) Int. Cl.
*G06F 15/16* (2006.01)
*H04L 12/26* (2006.01)
*H04L 12/24* (2006.01)
*H04L 12/911* (2013.01)
*H04L 29/08* (2006.01)

(52) U.S. Cl.
CPC ........ *H04L 43/0876* (2013.01); *H04L 41/0816* (2013.01); *H04L 41/0826* (2013.01); *H04L 41/0893* (2013.01); *H04L 47/70* (2013.01); *H04L 67/22* (2013.01); *H04L 43/0864* (2013.01)

(58) Field of Classification Search
CPC ....................................................... H04L 1/00
USPC .......................................................... 709/219
See application file for complete search history.

(56) References Cited

U.S. PATENT DOCUMENTS

| | | | | |
|---|---|---|---|---|
| 6,088,718 A * | 7/2000 | Altschuler et al. | ............ | 709/203 |
| 6,173,318 B1 * | 1/2001 | Jackson et al. | ................ | 709/219 |
| 6,411,922 B1 * | 6/2002 | Clark et al. | ....................... | 703/2 |
| 6,484,239 B1 * | 11/2002 | Hill et al. | ....................... | 711/137 |
| 6,681,228 B2 * | 1/2004 | Balogh | ........................ | 707/770 |
| 6,701,316 B1 * | 3/2004 | Li et al. | .................... | 370/395.41 |
| 7,047,258 B2 * | 5/2006 | Balogh et al. | ................. | 707/610 |
| 7,111,304 B2 * | 9/2006 | Hand et al. | ..................... | 719/315 |
| 7,406,053 B2 * | 7/2008 | Cheung et al. | ................ | 370/252 |
| 7,853,916 B1 * | 12/2010 | Trimberger et al. | .......... | 716/134 |
| 8,874,694 B2 * | 10/2014 | Wei | .............................. | 709/219 |
| 2001/0049727 A1 * | 12/2001 | Mukherjee et al. | ........... | 709/219 |
| 2003/0005074 A1 * | 1/2003 | Herz et al. | .................... | 709/216 |
| 2003/0217144 A1 * | 11/2003 | Fu et al. | ........................ | 709/224 |
| 2004/0148365 A1 * | 7/2004 | Tripathi | ........................ | 709/218 |

(Continued)

*Primary Examiner* — Alicia Baturay
(74) *Attorney, Agent, or Firm* — Baker Botts L.L.P.

(57) ABSTRACT

In one embodiment, a method includes accessing a data store comprising a log of requests transmitted by a plurality of remote hosts, each request corresponding to one or more resources maintained by a web site; analyzing the requests and one or more attributes of the resources corresponding to the respective requests using a cost function relating to network performance, wherein a first component of the cost function is directed to a performance improvement achieved by grouping one or more of the resources for transmission to one or more remote hosts and a second component is directed to a performance inefficiency caused by grouping the one or more resources for transmission to the one or more remote hosts; and identifying one or more groupings of one or more resources that optimize the cost function for network performance.

33 Claims, 4 Drawing Sheets

(56) References Cited

U.S. PATENT DOCUMENTS

| | | | |
|---|---|---|---|
| 2005/0027858 A1* | 2/2005 | Sloth et al. | 709/224 |
| 2005/0132054 A1* | 6/2005 | Chang et al. | 709/227 |
| 2006/0010253 A1* | 1/2006 | Aiken et al. | 709/250 |
| 2006/0069749 A1* | 3/2006 | Herz et al. | 709/219 |
| 2006/0085541 A1* | 4/2006 | Cuomo et al. | 709/224 |
| 2006/0101104 A1* | 5/2006 | Bhanot et al. | 708/105 |
| 2006/0173724 A1* | 8/2006 | Trefler et al. | 705/8 |
| 2008/0270579 A1* | 10/2008 | Herz et al. | 709/219 |
| 2008/0301399 A1* | 12/2008 | Yasue et al. | 711/213 |
| 2009/0055471 A1* | 2/2009 | Kozat et al. | 709/203 |
| 2009/0177792 A1* | 7/2009 | Guo et al. | 709/231 |
| 2010/0161756 A1* | 6/2010 | Lewis et al. | 709/217 |
| 2011/0038628 A1* | 2/2011 | Caviglia et al. | 398/58 |

* cited by examiner

|       | 304a | 304b | 304c | 304d | 304e | 304f | 304g | 304h |   |   |   |
|-------|------|------|------|------|------|------|------|------|---|---|---|
| 302a  | 1    | 1    | 0    | 1    | 0    | 0    | 1    | 1    | • | • | • |
| 302b  | 1    | 0    | 1    | 1    | 0    | 1    | 0    | 1    | • | • | • |
| 302c  | 1    | 0    | 1    | 0    | 0    | 1    | 1    | 0    | • | • | • |
| 302d  | 0    | 0    | 0    | 0    | 1    | 0    | 0    | 0    | • | • | • |
| 302e  | 1    | 1    | 1    | 0    | 0    | 0    | 1    | 1    | • | • | • |

*FIG. 3*

ADAPTIVE PACKAGING OF NETWORK RESOURCES

PRIORITY

This application is a continuation under 35 U.S.C. §120 of U.S. patent application Ser. No. 12/543,367, filed 18 Aug. 2009, which is incorporated herein by reference.

TECHNICAL FIELD

The present disclosure relates generally to network resource optimization and, more particularly, to network resource optimization using adaptive resource packaging.

BACKGROUND

Many static resource packaging systems run on build time for features. That is, product developers specify all the static resources that a feature (e.g., web application) may need, and a system groups these static resources into groups. Each group of resources is grouped into one package and transmitted in response to each of one or more predetermined requests. However, given the rapidly evolving state of websites, particularly social networking websites and websites supporting an increasing number of web applications that users may opt to include in particular personal pages, existing build-time systems are no longer optimal. Resources that are appropriate to package at any given point in time may no longer be appropriate to package together within a very short timeframe thereafter.

BRIEF DESCRIPTION OF THE DRAWINGS

FIG. 3 illustrates an example matrix.

DESCRIPTION OF EXAMPLE EMBODIMENTS

Figure 1:
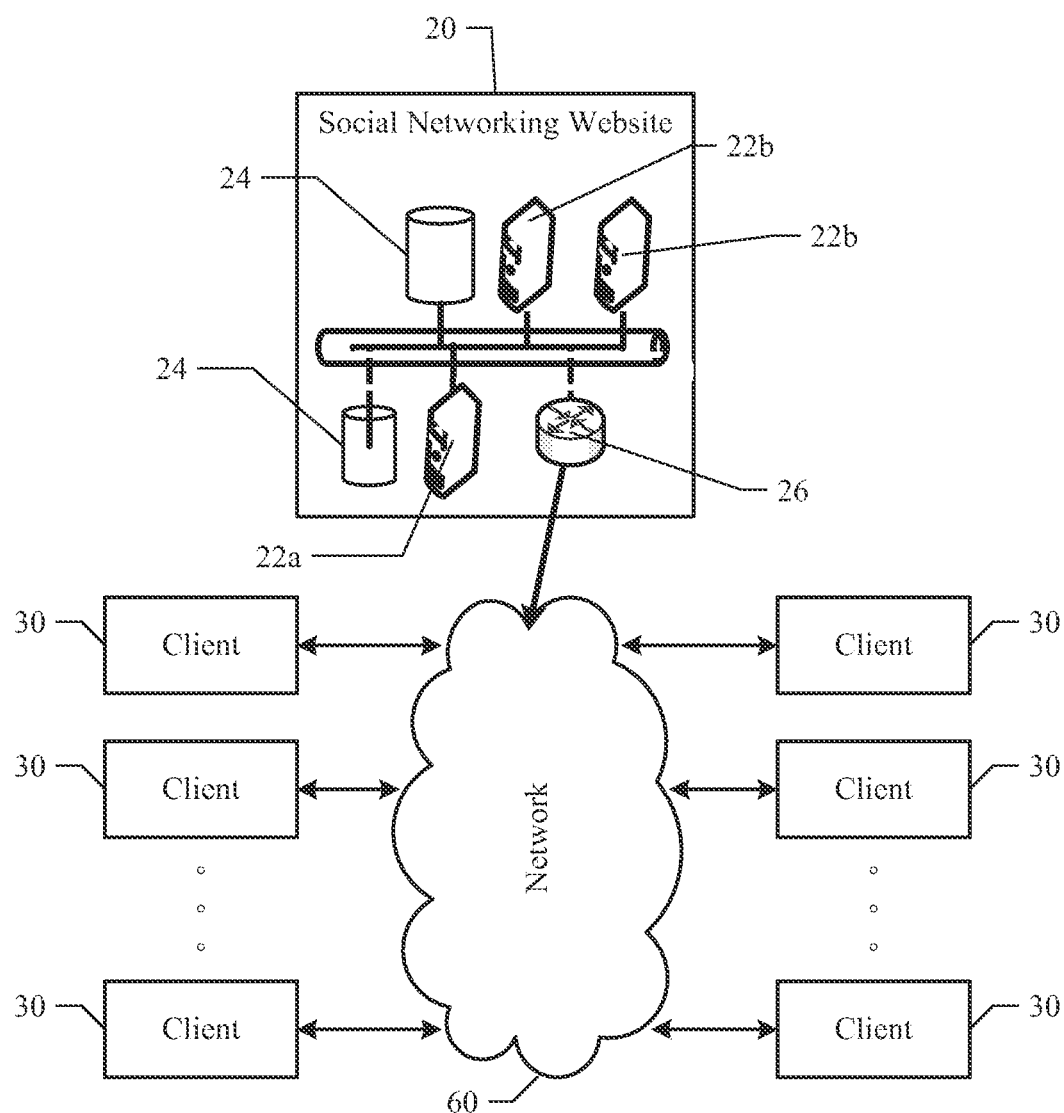
FIG. 1 illustrates an example network environment.

Particular embodiments relate to optimizing the packaging of resources. More specifically, in particular embodiments, one or more servers, databases (e.g., MySQL), and/or data warehouses (e.g., Hadoop/Hive) log actual requests for underlying resources (such as a profile page or home page), and/or embedded references or requests corresponding to particular resources identified in the underlying resources, transmitted from one or more remote host or client computing devices to one or more resource providers over a user session or any other period of measured time. In particular embodiments, the resource providers are resource providers of a service or website, such as, by way of example, a social networking website or social networking service within a website. In particular embodiments, the embedded resources may include JavaScript and/or Cascading Style Sheet (CSS) and/or image files used to implement various features of an underlying resource, such as webpages of the website. In particular embodiments, the one or more servers, databases, and/or data warehouses log some or all of the requests transmitted from some or all of the users and corresponding client computing devices associated with the website. As used herein, a "user" may be an individual or other entity (such as a group, business, or third party application). The term. "connection" or "friend," as used herein, may refer to an individual and/or entity with which a user of a social networking website may form an association, relationship, or other connection.

In particular embodiments, in response to a request for one or more resources or even the initial or subsequent accessing of a webpage from or by a client computing device, a set of packaged resources is transmitted from the resource providers to the client computing device. Packaging such resources into groups, as opposed to transmitting them individually, can improve network performance by reducing latency associated with round trip times involved in the separated requests, reducing processing resources by reducing the number of requests received at a website, and other protocol overhead. Resource packaging, however, may also waste bandwidth and needlessly insert latency into the end-user experience when one or more of the resources in the package is not actually used in a given web page requested by a user.

In particular embodiments, an optimization algorithm that may include a cost function analysis operates on all or a portion of the actual requests logged over any predetermined or desired period of time. In particular embodiments, the optimization algorithm and cost function are used to identify or determine a set of one or more groupings of resources to be packaged together to reduce the overall number of subsequent requests and optimize network application performance when serving subsequent requests. By way of example, the optimization algorithm and cost function may be used to operate on all actual requests logged for users of a particular demographic or geographic region during a specified period of time and/or a specified page or pages. The algorithm would determine a set of groupings of resources to be packaged together for serving requests by users of the particular demographic or geographic region (or for a specified page or pages) that would reduce the number of future requests required to be served for related requests during access sessions for a particular website.

Particular embodiments of the invention operate in a wide area network environment, such as the Internet, including multiple network addressable systems. FIG. 1 illustrates an example network environment, in which various example embodiments may operate. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like. As FIG. 1 illustrates, particular embodiments may operate in a network environment comprising social networking website 20 and one or more client devices 30. Client devices 30 are operably connected to the network environment via a network service provider, a wireless carrier, or any other suitable means.

The social networking website 20 comprises computing systems that allow members to communicate or otherwise interact with each other and access content, such as member profiles, as described herein. Social networking website 20 is a network addressable system that, in various example embodiments, comprises one or more physical servers 22 and data store 24. The one or more physical servers 22 are operably connected to computer network 60 via, by way of example, a set of routers and/or networking switches 26. In an example embodiment, the functionality hosted by the one or more physical servers 22 may include web or HTTP servers, FTP servers, and the like.

Physical servers 22 host functionality directed to the operations of a social network. By way of example, social networking website 20 may host a website that allows one or more users, at one or more client devices 30, to communicate with one another via the website. Data store 24 may store content and data relating to, and enabling, operation of the social network as digital data objects. A data object, in particular implementations, is an item of digital information typically stored or embodied in a data file, database or record. Content objects may take many forms, including: text (e.g., ASCII, SGML, and HTML), images (e.g., JPEG, TIFF, and (GIF), graphics (e.g., vector-based or bitmap), audio, video (e.g., MPEG), or other multimedia, and combinations thereof. Content object data may also include executable code objects (e.g., games executable within a browser window or frame), podcasts, etc. Logically, data store 24 corresponds to one or more of a variety of separate and integrated databases, such as relational databases and object-oriented databases, that maintain information as an integrated collection of logically related records or files stored on one or more physical systems. Structurally, data store 24 may generally include one or more of a large class of data storage and management systems. In particular embodiments, data store 24 may be implemented by any suitable physical system(s) including components, such as one or more database servers, mass storage media, media library systems, storage area networks, data storage clouds, and the like. In one example embodiment, data store 24 includes one or more servers, databases (e.g., MySQL), and/or data warehouses (e.g., Hadoop/Hive).

Data store 24 may include data associated with different social networking website 20 users and/or client devices 30. In particular embodiments, the social networking website 20 maintains a member profile for each member of the website 20. Member profiles include data that describe the members of a social network, including proper names (first, middle and last of a person, a trade name and/or company name of a business entity, etc.) biographic, demographic, and other types of descriptive information, such as work experience, educational history, hobbies or preferences, geographic location, and additional descriptive data. By way of example, member profiles may include a member's birthday, relationship status, city of residence, and the like. The website 20 may further store data describing one or more relationships between different members. The relationship information may indicate members who have similar or common work experience, group memberships, hobbies, or educational history. A member profile may also include privacy settings governing how accessible the member's information is to other users.

Client device 30 is generally a computer or computing device including functionality for communicating (e.g., remotely) over a computer network. Client device 30 may be a desktop computer, laptop computer, personal digital assistant (PDA), in- or out-of-car navigation system, smart phone or other cellular or mobile phone, or mobile gaming device, among other suitable computing devices. Client device 30 may execute one or more client applications, such as a web browser (e.g., MICROSOFT WINDOWS INTERNET EXPLORER, MOZILLA FIREFOX, APPLE SAFARI, GOOGLE CHROME, and OPERA, etc.), to access and view content over a computer network. In particular implementations, the client applications allow a user of client device 30 to enter addresses of specific network resources, such as resources hosted by social networking website 20, to be retrieved. These addresses can be Uniform Resource Locators, or URLs. In addition, once a page or other resource has been retrieved, the client applications may provide access to other pages or records when the user "clicks" on hyperlinks to other resources. By way of example, such hyperlinks may be located within the web pages and provide an automated way for the user to enter the URI, of another page and to retrieve that page.

Generally, a web application is an application that may be accessed via a web browser over a network or a computer software application that is coded in a web browser-supported language and reliant on a web browser to render the application executable. Web applications have gained popularity largely as a result of the ubiquity of web browsers, the convenience of using a web browser launched at a remote computing device as a client (sometimes referred to as a thin client), and the corresponding ability to update and maintain web applications without distributing and installing software on remote clients. Often, to implement a web application, the web application requires access to one or more resources provided at a backend server of an associated website. Additionally, web applications often require access to additional resources associated with other applications.

A resource or page, which may itself include multiple resources, may include data records, such as content plain textual information, or more complex digitally encoded multimedia content, such as software programs or other code objects, graphics, images, audio signals, videos, and so forth. One prevalent markup language for creating web pages is the Hypertext Markup Language (HTML). Other common web browser-supported languages include the Extensible Markup Language (XML), the Extensible Hypertext Markup Language (XHTML), JavaScript, Cascading Style Sheet (CSS), and, frequently, Java. By way of example, HTML enables a page developer to create a structured document by denoting structural semantics for text and links, as well as images, web applications and other objects that can be embedded within the page. Generally, a web page may be delivered to a client as a static document, however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

JavaScript is an example of a scripting language that enables various web applications to access resources within other applications for use on the client side of a user session to enable an interactive or dynamic user session when accessing a website. AJAX (shorthand for Asynchronous JavaScript and XML) refers to a group of interrelated techniques used on the client side of a user session to enable more interactive and rich internet applications. Utilizing JavaScript or AJAX, a web application can transmit requests for resources to the backend servers (e.g., servers 22) of the website or other resource providers external to the website in order to retrieve the resources asynchronously in the background operations of the client 30 without interfering with the display and behavior of the currently-rendered page. More particularly, when using AJAX, resources are usually retrieved by transmitting an XMLHttpRequest (XHR) object to the resource provider. An XHR is a document object model (DOM) application programming interface (API) that can be used in a web browser scripting language (e.g., JavaScript) to send an HTTP or HTTPS request for a resource directly to a web server (e.g., server 22) and load the resource retrieved from the server in response to the request directly back into the scripting language code. Once the resource is within the code, the resource may then be available as, by way of example, an XML document or plain text. In this manner, the retrieved resource may be used to manipulate the currently active document rendered by the web browser without requiring the client to load a new webpage document. In some example embodiments, if the resource is retrieved as plain text, the plain text may be formatted in JavaScript Object Notation (JSON) by the server and evaluated within JavaScript to create an object of data for use on the current DOM.

Social networking website 20 may include a multitude of features with which users at remote clients 30 may interact during user sessions. In particular embodiments, these features may be implemented as web applications and may utilize JavaScript and Cascading Style Sheet (CSS) resources requested from servers 22 as well as other external servers. By way of example, the social networking website hosted by Facebook(r), Inc, of Palo Alto, Calif., includes or supports such features as the "wall," a space on every user's profile page that allows friends to post messages for the user to see; "pokes," which allows users to send a virtual "poke" to each other (a notification that tells a user that they have been poked); "photos," where users can upload albums and photos; "status," which allows users to inform their friends of their whereabouts and actions; "streams," which may appear in multiple locations on the site, including on every user's homepage, which include information about the activities of the user's connections; "notes," a blogging feature that allows tags and embeddable images as well as blogs imported from other blogging websites and services; as well as a huge number of third party applications for which the website serves as a platform. In particular, a user's wall is visible to anyone who is able to see that user's profile, depending on privacy settings, and supports the posting of attachments as well as textual content.

In particular embodiments, the social networking website 20 maintains in data store 24 a number of objects for the different kinds of items with which a member may interact while accessing website 20. In one example embodiment, these objects include member profiles, application objects, and message objects (such as for wall posts, emails and other messages). In one embodiment, an object is stored by the website 20 for each instance of its associated item. These objects and the actions discussed herein are provided for illustration purposes only, and it can be appreciated that an unlimited number of variations and features can be provided on a social networking website 20.

In particular embodiments, data store 24 is further operative to maintain one or more logs of submitted user requests and their corresponding responses. By way of example, each time a page is requested or each time a web application embedded within a page requests a set of resources (such as a set of CSS or JavaScript codes), data store 24 may log the specific request and the response transmitted to the appropriate user or client making the request. Other identifying attributes or information may also be logged, such as the time the request was transmitted or received, the time the response was transmitted, the source (e.g., user and/or client device) of the request, the application making the request, the specific resources required to implement the application, the specific resources sent in the response (which may be used in determining whether resources transmitted to the client are actually used) and, in particular embodiments, any other information indicating whether each resource transmitted to the client was actually used to serve a request or implement an application (hereinafter collectively referred to as logged request data). In a particular implementation, a process may scan a log of various attributes of web pages provided to remote clients, such as the types of resources (e.g., CSSs and JavaScript code modules) actually embedded in the web pages transmitted to users. By way of example, a Personal Home Page (PHP) code may determine which resource or resources correspond to each request. In a second implementation, the PHP code may provide hooks to allow page generation code to declare all the JavaScript, CSS and Images that are required to fulfill particular page or AJAX requests, and log the requirement declaration into data store 24. In a third possible implementation, there may be a JavaScript process running on the client 30 side that identifies all the JavaScript, CSS and images that are used and reports the usages to logging servers that store corresponding usage information in data store 24. In some embodiments, a combination of these three implementations may be used; that is, the second implementation may be used as the main source of data while the other implementations may be used for data reliability and accuracy (e.g., "sanity") checks.

Figure 2:
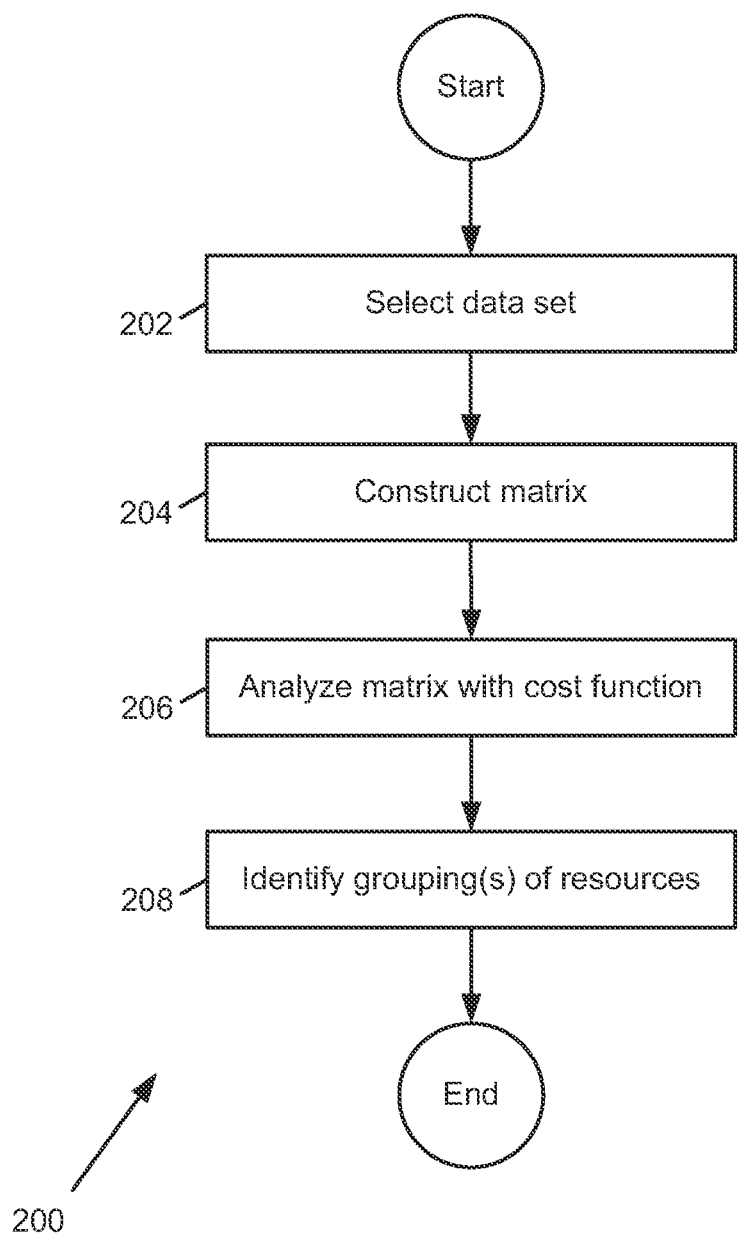
FIG. 2 illustrates an example optimization process.

In particular embodiments, an optimization process or algorithm operates on the log of requests to analyze possible packages of resources that may improve overall network performance of the website 20. FIG. 2 illustrates an example optimization process 200 for use in identifying a set of groupings of resources that reduce the number of future requests required to serve or implement a number of features during access sessions of a particular website. In a particular embodiment, optimization process 200 begins at 202 with selecting all or a subset of the logged data in data store 24 for use in the optimization. By way of example, the subset of data may include the logged request data for all or a predetermined portion of all registered users of social networking website 20. More particularly, the predetermined portion of all registered users may include or consist of some or all users of a particular country or geographic region, of a particular demographic, of a particular page, of a particular feature, or any combination or subcombination thereof. Additionally, the subset of data may include the logged request data for a specific window of analysis time. By way of example, the subset of data may include the logged request data for the last day, week, month, or year of requests. Alternatively, the subset of data may include the logged request data for any window of past time (e.g., March of 2008). In an alternate embodiment, the subset of data may include the logged request data for a particular user or group of users during his, her, or their last user N sessions, where N is equal to or greater than 1. Still further, the data may be filtered against other attributes, such as requests for particular pages or page types, such as user profile pages, home pages, and the like.

In particular embodiments, optimization process 200 then constructs a matrix or data array at 204. FIG. 3 illustrates an example matrix 300. In particular embodiments, each row 302 of matrix 300 represents an actual logged request in the subset of logged requests stored within data store 24 and each column 304 represents a resource (e.g., a JavaScript or CSS file) that may be required to serve the request or implement the application making the request. By way of example, the columns may represent a resource, such as a CSS, a JavaScript, or an image, that is embedded in a page corresponding to the request. By way of example, matrix 300 may include tens, hundreds, thousands, millions, or hundreds of millions (or more) of rows 302 as well as tens, hundreds, or thousands (or more) of columns 304. In an example embodiment, a logical "1" stored at a logical element 306 defined by the logical intersection of a row 302 and column 304 may indicate that the particular request associated with the row required the particular resource associated with the column or, alternately, that the particular resource was sent in response to a subsequent request because a call to it was embedded in the page corresponding to a particular request. Conversely, a logical "0" stored at a logical element 306 defined by the logical intersection of a row 302 and column 304 may indicate that the underlying page or resource corresponding to the particular request associated with the row did not require the particular resource associated with the column. It should be noted that the logical values in matrix 300 are for didactic purposes only.

Optimization process 200 then proceeds to analyze matrix 300 at 206 and identify, at 208, a set of groupings of resources to be packaged together. In particular embodiments, a cost function is utilized to analyze matrix 300 and to determine or identify the groupings. By way of example, the optimization process 200 may operate or try the cost function on a specific grouping of resources corresponding to columns 304a, 304b, and 304d. In particular embodiments, the output value of the cost function, CFV, is a value that represents the difference between an associated gain and an associated cost incurred in packaging the resources in the grouping into one package, as summarized below:

$$CFV = Gain - Cost. \quad (1)$$

In particular embodiments, the gain associated with a grouping of two or more resources represents an aggregate round trip time (RTT) that would have been saved in transmitting the resources in the grouping in one package in response to a particular request as compared to packaging each of the resources in the grouping individually. Thus, equation (1) becomes:

$$CFV = RTT - Cost. \quad (2)$$

More particularly, assuming an application running on a client 30 calls or requests the resource in column 304a. The request is then sent to a server e.g., server 22) and a response including the resource is subsequently transmitted to the client 30 for use by the application. Now suppose the same application or a second application then requests the resource in column 304b. Again, the request is sent to the server and a response including the resource is received. Thus, in this example, two RTTs are required to serve the two requests. By way of example or reference, an RTT may be on the order of 50 ms for a domestic user and on the order of 200 ms for an international user. However, if the two required resources were packaged together and sent, for example, in response to the first request, then one RTT would be saved as the second request would not be required since the second resource is already available. However, the RTT is only saved if both resources are actually used. Thus, in particular embodiments, the optimization process 200 analyzes matrix 300 to look for combinations of resources that have been 1) frequently requested together (for example, by being embedded in the same page, such as a user profile page) or 2) frequently requested in general. In this manner, by essentially predicting which resources are likely to be requested, the number of future requests may be reduced. In the above example, the gain associated with packaging the resources in columns 304a, 304b, and 304d together into one package would be 1+1=2 (normalized to unites of RTT) for the particular request logged in row 302a, while the gain associated with packaging the resources in columns 304a, 304b, and 304d together into one package would be 1+0=1 (normalized to units of RTT), for the particular request logged in row 302b. Note that, in the above example, the gain is normalized to units of RTT, or units of normalized RTT if the requests are transmitted from various different geographic locations. However, in particular embodiments, the gain for each grouping for each request is measured in standard units such as, by way of example seconds(s), milliseconds (ms), or other appropriate unit or normalized unit. In another embodiment the RTT for each request may be computed based on the timing of TCP connection handshake packets.

In particular embodiments, the cost associated with a grouping of two or more resources represents an aggregate amount of unused data that would have been transmitted in transmitting the resources in the grouping into one package in response to a particular request as compared to packaging each of the resources in the grouping individually. However, to translate this cost of unused data into a latency to match units with the gain, the unused data may be divided by a bandwidth value of the network. This value may then also be normalized to units of RTT or other suitable unit. In this way, the cost represents a latency incurred if the resources corresponding to the unused data were not used to serve a request and equation (2) becomes:

$$CFV = RTT - \frac{UnusedData}{Bandwidth}. \quad (3)$$

Of course, the amount of unused data depends on the size of the resource. In the above example, assuming that the resource in column 304a has a size of 100 Kilobits (Kb), the resource in column 304b has a size of 200 Kb, and the resource in column 304d has a size of 300 Kb, and that the bandwidth is 1.5 Megabits per second (Mbps), the cost would be (0+0+300 Kb/1/5 Mbps=0.2 seconds, assuming a subsequent request for which these resources were packaged into one package was identical to the request logged in row 302e. Assuming an RTT of 50 ms, this cost would translate into 4 RTTs. As another example, assuming a subsequent request (for which the resources were packaged into one package) was identical for the request logged in row 302a, the cost would be 0 seconds or RTTs, because all of the data in the resources would be used.

However, this CFV value represents the value of the cost function for only one grouping and for only one specific request. In particular embodiments, the optimization process 200 uses the cost function to operate on or try all possible combinations of groupings over all of the logged requests in matrix 300 to determine a set of one or more groupings for all the resources in matrix 300, in which each grouping includes one or more resources. As such, the aggregate gain for a particular grouping represents a sum over all requests and the aggregate cost represents a sum over all requests. In this manner, the cost function over all requests for each grouping becomes:

$$CFV_{Grouping} = \sum_{All\ Requests} Gain - \sum_{All\ Requests} Cost. \quad (4)$$

Furthermore, in some embodiments, the optimization process 200 may analyze all combinations of groupings to identify the set of groupings that maximizes equation (4). Said again, optimization process 200 applies equation (4) to each grouping in each possible set of groupings (where each set of groupings includes all of the resources of matrix 300 whether grouped or individual) and sums these values together. In this manner, the cost function over all groupings in a set of groupings becomes:

$$CFV_{Set} = \sum_{AllGroupings} CFV_{Grouping}. \quad (5)$$

Optimization process 200 then picks the set of groupings that maximizes equation (5). However, in a particular embodiment, in order to reduce the complexity of optimization process 200 and the resources required to implement optimization process 200, a greedy, simulated annealing, or other complexity-reducing or solution-set-reducing algorithm may be utilized to reduce the number of sets of groupings tried by optimization process 200. Generally, a greedy algorithm is any algorithm that follows the problem-solving meta-heuristic of making the locally optimal choice at each stage with the hope of finding the global optimum.

Once the optimization process 200 has identified an optimal set of groupings at 208, these groupings may be stored for use in serving subsequent requests for resources and/or utilized in defining packages of resources to be downloaded to remote hosts in response to requests for particular page types, such as a request for a profile page, a home page. By way of example, referring again to FIG. 3, the optimal set of groupings may dictate that the resources associated with columns 304a, 304b, and 304d are grouped together as one package and transmitted as one package to client 30 any time a request is received that requests or calls an underlying resource, such as a profile page or home page, that may include embedded calls or refrences to any one of the resources in the grouping. Similarly, the optimal set of groupings may dictate that the resources associated with columns 304c and 304f are grouped as one package and transmitted as one package to client 30 any time a request is received that requests or calls an underlying resource associated with column 304c or 304f. As another example, the optimal set of groupings may dictate that the resource associated with column 304e is packaged by itself In some embodiments, commonly called or requested resources may be automatically packaged together into one or more packages and transmitted to the client 30 simply in response to client 30 accessing a webpage of the website 20. In particular embodiments, the optimization process 200 may be repeated on a periodic or predetermined basis (e.g., daily, weekly, or monthly) to ensure the groupings remain optimized with the usage of the website. By way of example, as new applications are developed and usage of existing applications wanes or otherwise changes, new groupings may be made to better optimize performance.

Referring back to the cost function of equation (1), in particular embodiments, a likelihood that a resource may be changed is used to modify the cost term of the cost function or, alternately, to add a new term to the cost function. More particularly, when any resource in a grouping of resources is changed, the group (as a single web object stored in client 30) must be refreshed as a whole, and thus the cached resources are replaced. Hence, the data sent with the original package corresponding to the changed resource may be considered wasted as well as the data corresponding to the unchanged resources in the subsequent package. Generally, when a page is requested, a package of one or more resources is transmitted down and cached regardless of whether or not the underlying profile page includes an embedded reference to it. By way of example, the cost term may be modified for a particular resource based on when the resource was developed or based on its stage of development indicating a likelihood that the resource may be changed. In one example embodiment, the cost term associated with the resource may be weighted. More particularly, the latency value may be multiplied by a weight, where the value of the weight is a value between and including 0 and 1 (a 1 indicating that the resource is likely to be changed and a lower value indicating an increasing likelihood that the resource will not be changed). By way of example, if we denote L as the likelihood that a single Javascript/CSS/Image resource will be changed, the likelihood that it is unchanged is 1-L. As a package is changed if any of its resources is changed, the probability that the package is unchanged equals the product of the probabilities that each resource is unchanged, given by equation (6) below:

$$\prod_{AllResourcesInThisPackage} (1 - L_{ChangeLikelihoodOfAResource}) \quad (6)$$

and the probability that the package is changed equals:

$$\left[1 - \prod_{AllResourcesInThisPackage} (1 - L_{ChangeLikelihoodOfAResource})\right] \quad (7)$$

Based on this model, one version of the weighted cost will he, comparing to (4):

$$CFV_{Grouping} = \left(\sum_{All\ Requests} Gain - \sum_{All\ Requests} Cost\right) \quad (8)$$
$$\left(1 - \prod_{AllResourcesInThisGrouping} (1 - L_{ChangeLikelihoodOfAResource})\right)$$

In this way, resources that have similar frequencies (or likelihoods) of change are favored for packaging together. Other factors and attributes may also be considered and incorporated within the cost functions of equations (1)-(8) and are within the scope of the appended claims.

As described herein, the optimization process 200 can be implemented as a series of computer-readable instructions, embodied or encoded on or within a tangible data storage medium, that when executed are operable to cause one or more processors to implement the operations described above. For smaller datasets, the operations described above can be executed on a single computing platform or node. For larger systems and resulting data sets, parallel computing platforms can be used. For example, the operations discussed above can be implemented using Hive to accomplish ad hoc querying, summarization and data analysis, as well as using as incorporating statistical modules by embedding mapper and reducer scripts, such as Python or Perl scripts that implement a statistical algorithm. Other development platforms that can leverage Hadoop or other Map-Reduce execution engines can be used as well.

The Apache Software Foundation has developed a collection of programs called Hadoop, which includes: (a) a distributed file system; and (b) an application programming interface (API) and corresponding implementation of MapReduce. FIG. 1 illustrates an example distributed computing system, consisting of one master server 22a and two slave servers 22b. In some embodiments, the distributed computing system comprises a high-availability cluster of commodity servers in which the slave servers are typically called nodes. Though only two nodes are shown in FIG. 1, the number of nodes might well exceed a hundred, or even a thousand or more, in some embodiments. Ordinarily, nodes in a high-availability cluster are redundant, so that if one node crashes while performing a particular application, the cluster software can restart the application on one or more other nodes.

Multiple nodes also facilitate the parallel processing of large databases. In some embodiments, a master server, such as 22*a*, receives a job from a client and then assigns tasks resulting from that job to slave servers or nodes, such as servers 22*b*, which do the actual work of executing the assigned tasks upon instruction from the master and which move data between tasks. In some embodiments, the client jobs will invoke Hadoop's MapReduce functionality, as discussed above.

Likewise, in some embodiments, a master server, such as server 22*a*, governs a distributed file system that supports parallel processing of large databases. In particular, the master server 22*a* manages the file system's namespace and block mapping to nodes, as well as client access to files, which are actually stored on slave servers or nodes, such as servers 22*b*. In turn, in some embodiments, the slave servers do the actual work of executing read and write requests from clients and perform block creation, deletion, and replication upon instruction from the master server.

While the foregoing processes and mechanisms can be implemented by a wide variety of physical systems and in a wide variety of network and computing environments, the server or computing systems described below provide example computing system architectures for didactic, rather than limiting, purposes.

Figure 4:
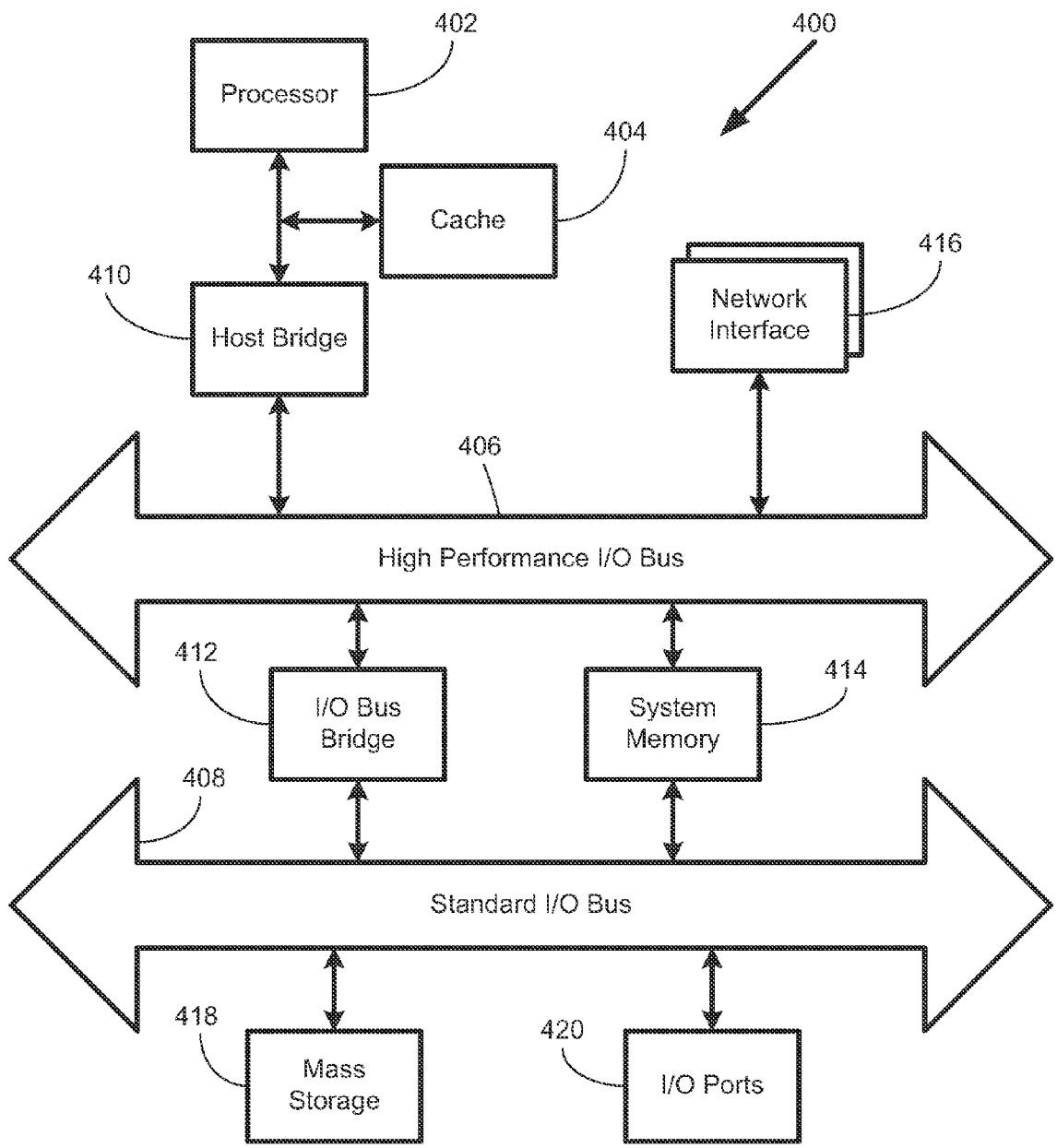
FIG. 4 illustrates an example computer system architecture.

FIG. 4 illustrates an example computing system architecture, which may be used to implement a server 22*a*, 22*b*. In one embodiment, hardware system 400 comprises a processor 402, a cache memory 404, and one or more executable modules and drivers, stored on a tangible computer readable medium, directed to the functions described herein. Additionally, hardware system 400 includes a high performance input/output (I/O) bus 406 and a standard bus 408. A host bridge 410 couples processor 402 to high performance I/O bus 406, whereas I/O bus bridge 412 couples the two buses 406 and 408 to each other. A system memory 414 and one or more network/communication interfaces 416 couple to bus 406. Hardware system 400 may further include video memory (not shown) and a display device coupled to the video memory. Mass storage 418 and ports 420 couple to bus 408. Hardware system 400 may optionally include a keyboard and pointing device, and a display device (not shown) coupled to bus 408. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 400 are described in greater detail below. In particular, network interface 416 provides communication between hardware system 400 and any of a wide range of networks, such as an Ethernet (e.g., IEEE 802.3) network, a backplane, etc. Mass storage 418 provides permanent storage for the data and programming instructions to perform the above-described functions implemented in the servers 22*a*, 22*b*, whereas system memory 414 (e.g., DRAM) provides temporary storage for the data and programming instructions when executed by processor 402. I/O ports 420 are one or more serial and/or parallel communication ports that provide communication between additional peripheral devices, which may be coupled to hardware system 400.

Hardware system 400 may include a variety of system architectures; and various components of hardware system 400 may be rearranged. For example, cache 404 may be on-chip with processor 402. Alternatively, cache 404 and processor 402 may be packed together as a "processor module," with processor 402 being referred to as the "processor core." Furthermore, certain embodiments of the present invention may not require nor include all of the above components. For example, the peripheral devices shown coupled to standard I/O bus 408 may couple to high performance I/O bus 406. In addition, in some embodiments, only a single bus may exist, with the components of hardware system 400 being coupled to the single bus. Furthermore, hardware system 400 may include additional components, such as additional processors, storage devices, or memories.

In one implementation, the operations of the embodiments described herein are implemented as a series of executable modules run by hardware system 400, individually or collectively in a distributed computing environment. In a particular embodiment, a set of software modules and/or drivers implements a network communications protocol stack, parallel computing functions, optimization processes, and the like. The foregoing functional modules may be realized by hardware, executable modules stored on a computer readable medium, or a combination of both. For example, the functional modules may comprise a plurality or series of instructions to be executed by a processor in a hardware system, such as processor 402. Initially, the series of instructions may be stored on a storage device, such as mass storage 418. However, the series of instructions can be tangibly stored on any suitable storage medium, such as a diskette, CD-ROM, ROM, EEPROM, etc. Furthermore, the series of instructions need not be stored locally, and could be received from a remote storage device, such as a server on a network, via network/communications interface 416. The instructions are copied from the storage device, such as mass storage 418, into memory 414 and then accessed and executed by processor 402.

An operating system manages and controls the operation of hardware system 400, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft (r) Windows(r) operating systems, BSD operating systems, and the like. Of course, other implementations are possible. For example, the nickname generating functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. By way of example, while embodiments of the present invention have been described as operating in connection with a social networking website, the present invention can be used in connection with any communications facility that supports web applications. Furthermore, in some embodiments the term "web service" and "web site" may be used interchangeably and additionally may refer to a custom or generalized API on a device, such as a mobile device (e.g., cellular phone, smart phone, personal OPS, personal digital assistance, personal gaming device, etc.), that makes API calls directly to a server. Additionally, it should be noted that the term "user" as used herein may encompass any type of entity that can be represented on, for example, a social network. By way of example, a "user" or "member" as used herein in may be an individual, group or other entity (e.g., a business or third party application).

The invention claimed is:

1. A method comprising:
   accessing, by one or more computer servers, a first data store comprising a log of requests transmitted by a plurality of remote hosts, each request corresponding to one or more resources of a plurality of resources;
   analyzing, by the computer servers, the requests and one or more attributes of the resources using a cost function, wherein a first component of the cost function is directed to a performance improvement achieved by grouping one or more of the resources for transmission to one or more remote hosts and a second component is directed to a performance inefficiency caused by the grouping the one or more of the resources;
   identifying, by the computer servers, one or more groupings of the resources to be included in a package of resources; and
   transmitting the package of resources in a single response to a request corresponding to at least one of the resources in the package.

2. The method of claim 1, wherein combinations of resources that have been frequently requested together or frequently requested in general are analyzed to identify one or more groupings of resources to be included in a package of resources.

3. The method of claim 2, wherein at least one of the combinations of resources that have been frequently requested together comprise resources associated with a social networking object.

4. The method of claim 1, wherein a second data store comprises objects for interactive content items for display on a social-networking site, and wherein at least one of the identified groupings comprises resources associated with one of the objects.

5. The method of claim 1, wherein a second data store comprises objects associated with a profile page or home page on a social-networking site, and wherein at least one of the identified groupings comprises resources associated with one of the objects.

6. The method of claim 1, wherein a resource includes plain textual information, software, graphics, images, audio signals, or video.

7. The method of claim 1, further comprising:
   selecting all or a subset of the logged request data for all or a predetermined portion of all users of a social network.

8. The method of claim 7, wherein the subset of data selected is associated with a specific window of time, or with a particular user or group of users during his, her, or their last N sessions, where N is greater or equal to 1.

9. The method of claim 7, wherein a predetermined portion of users includes or consists of users of a particular geographic region, a particular demographic, a particular page, a particular feature, or any combination or sub-combination thereof.

10. The method of claim 1, further comprising:
    storing the one or more groupings in one or more computer-readable non-transitory tangible storage media; and
    sending resources that are grouped together as one package to a client in response to a request.

11. The method of claim 10, wherein the request is for a profile page or home page of a social-networking site, and wherein at least one of the groupings comprises a combination of resources included in the profile page or home page.

12. One or more computer-readable non-transitory storage media embodying software that is operable when executed by one or more processors to:
    access, by one or more computer servers, a first data store comprising a log of requests transmitted by a plurality of remote hosts, each request corresponding to one or more resources of a plurality of resources;
    analyze, by the computer servers, the requests and one or more attributes of the resources using a cost function, wherein a first component of the cost function is directed to a performance improvement achieved by grouping one or more of the resources for transmission to one or more remote hosts and a second component is directed to a performance inefficiency caused by the grouping the one or more of the resources;
    identify, by the computer servers, one or more groupings of the resources to be included in a package of resources; and
    transmit the package of resources in a single response to a request corresponding to at least one of the resources in the package.

13. The media of claim 12, wherein combinations of resources that have been frequently requested together or frequently requested in general are analyzed to identify one or more groupings of resources to be included in a package of resources.

14. The media of claim 13, wherein at least one of the combinations of resources that have been frequently requested together comprise resources associated with a social networking object.

15. The media of claim 12, wherein a second data store comprises objects for interactive content items for display on a social-networking site, and wherein at least one of the identified groupings comprises resources associated with one of the objects.

16. The media of claim 12, wherein a second data store comprises objects associated with a profile page or home page on a social-networking site, and wherein at least one of the identified groupings comprises resources associated with one of the objects.

17. The media of claim 12, wherein a resource includes plain textual information, software, graphics, images, audio signals, or video.

18. The media of claim 12, further comprising:
    selecting all or a subset of the logged request data for all or a predetermined portion of all users of a social network.

19. The media of claim 18, wherein the subset of data selected is associated with a specific window of time, or with a particular user or group of users during his, her, or their last N sessions, where N is greater or equal to 1.

20. The media of claim 18, wherein a predetermined portion of users includes or consists of users of a particular geographic region, a particular demographic, a particular page, a particular feature, or any combination or sub-combination thereof.

21. The media of claim 12, further comprising:
storing the one or more groupings in one or more computer-readable non-transitory tangible storage media; and
sending resources that are grouped together as one package to a client in response to a request.

22. The media of claim 21, wherein the request is for a profile page or home page of a social-networking site, and wherein at least one of the groupings comprises a combination of resources included in the profile page or home page.

23. A system comprising:
one or more processors; and
a memory coupled to the processors comprising instructions executable by the processors, the processors being operable when executing the instructions to:
access, by one or more computer servers, a first data store comprising a log of requests transmitted by a plurality of remote hosts, each request corresponding to one or more resources of a plurality of resources;
analyze, by the computer servers, the requests and one or more attributes of the resources using a cost function, wherein a first component of the cost function is directed to a performance improvement achieved by grouping one or more of the resources for transmission to one or more remote hosts and a second component is directed to a performance inefficiency caused by the grouping the one or more of the resources;
identify, by the computer servers, one or more groupings of the resources to be included in a package of resources; and
transmit the package of resources in a single response to a request corresponding to at least one of the resources in the package.

24. The system of claim 23, the processors being further operable when executing the instructions to:
selecting all or a subset of the logged request data for all or a predetermined portion of all users of a social network.

25. The system of claim 24, wherein the subset of data selected is associated with a specific window of time, or with a particular user or group of users during his, her, or their last N sessions, where N is greater or equal to 1.

26. The system of claim 24, wherein a predetermined portion of users includes or consists of users of a particular geographic region, a particular demographic, a particular page, a particular feature, or any combination or sub-combination thereof.

27. The system of claim 23, wherein combinations of resources that have been frequently requested together or frequently requested in general are analyzed to identify one or more groupings of resources to be included in a package of resources.

28. The system of claim 27, wherein at least one of the combinations of resources that have been frequently requested together comprise resources associated with a social networking object.

29. The system of claim 23, wherein a second data store comprises objects for interactive content items for display on a social-networking site, and wherein at least one of the identified groupings comprises resources associated with one of the objects.

30. The system of claim 23, wherein a second data store comprises objects associated with a profile page or home page on a social-networking site, and wherein at least one of the identified groupings comprises resources associated with one of the objects.

31. The system of claim 23, wherein a resource includes plain textual information, software, graphics, images, audio signals, or video.

32. The system of claim 23, further comprising:
storing the one or more groupings in one or more computer-readable non-transitory tangible storage media; and
sending resources that are grouped together as one package to a client in response to a request.

33. The system of claim 32, wherein the request is for a profile page or home page of a social-networking site, and wherein at least one of the groupings comprises a combination of resources included in the profile page or home page.

* * * * *